US009358710B2

(12) United States Patent
Witz et al.

(10) Patent No.: US 9,358,710 B2
(45) Date of Patent: Jun. 7, 2016

(54) PREFORM AND A MOLD STACK FOR PRODUCING THE PREFORM

(75) Inventors: Jean-Christophe Witz, Yutz (FR); Ralf Walter Fisch, Saarburg (DE)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 0 days.

(21) Appl. No.: 13/885,516

(22) PCT Filed: Nov. 3, 2011

(86) PCT No.: PCT/CA2011/050687
§ 371 (c)(1),
(2), (4) Date: May 15, 2013

(87) PCT Pub. No.: WO2012/075578
PCT Pub. Date: Jun. 14, 2012

(65) Prior Publication Data
US 2013/0244050 A1    Sep. 19, 2013

Related U.S. Application Data

(60) Provisional application No. 61/421,254, filed on Dec. 9, 2010.

(51) Int. Cl.
*B29B 7/00* (2006.01)
*B29C 45/16* (2006.01)
(Continued)

(52) U.S. Cl.
CPC ............. *B29C 45/1684* (2013.01); *B29B 11/08* (2013.01); *B29B 11/14* (2013.01);
(Continued)

(58) Field of Classification Search
CPC ............. B29B 2911/1402; B29B 2911/14026; B29B 2911/14033; B29B 2911/1404; B29B 2911/14106; B29B 2911/14133; B29B 2911/14326; B29B 2911/14333; B29B 2911/1434; B29B 2911/1436; B29B 2911/144406; B29B 2911/14446; B29B 2911/14466; B29B 2911/14486; B29B 2911/14493; B29B 2911/145; B29B 2911/1464; B29B 2911/14593; B29B 2911/14826; B29B 11/14; B29B 11/08; B29C 45/0055; B29C 45/1625; B29C 45/1646; B29C 45/1684; B29C 45/261; B29C 49/12; B29C 2049/2008; B29C 2049/2013
USPC .......... D9/740–746, 738, 751, 752, 520, 522, D9/562, 568, 569, 570, 904; D15/135, 136
See application file for complete search history.

(56) References Cited

U.S. PATENT DOCUMENTS 3,979,491 A    9/1976  Zavasnik
D260,240 S  *  8/1981  Carluccio ...................... D9/520
(Continued)

FOREIGN PATENT DOCUMENTS

CN    1054565 A    9/1991
CN    101678593 A    3/2010
(Continued)

OTHER PUBLICATIONS

PCT International Search Report, Daigle, Julien, Jan. 19, 2012, 3 pages.
(Continued)

*Primary Examiner* — Humera Sheikh
*Assistant Examiner* — Seth Dumbris

(57) ABSTRACT

Disclosed is a preform (300) suitable for subsequent blow-molding into a final-shaped container. The preform comprises a neck portion (302); a gate portion (306); and a body portion (304) extending between said neck portion and said gate portion; the gate portion including an upwardly-bound region (324) defined between the inner and outer walls thereof, substantially whole of the upwardly-bound region extending in a direction towards the neck portion (302).

3 Claims, 13 Drawing Sheets

(51) Int. Cl.
  *B29C 45/00* (2006.01)
  *B29C 45/26* (2006.01)
  *B29C 45/27* (2006.01)
  *B29B 11/08* (2006.01)
  *B29B 11/14* (2006.01)
  *B29C 49/42* (2006.01)
  *B29C 49/06* (2006.01)
  *B29C 49/12* (2006.01)
  *B29C 49/64* (2006.01)

(52) U.S. Cl.
  CPC ........... *B29C45/0055* (2013.01); *B29C 45/261* (2013.01); *B29C 45/2711* (2013.01); *B29C 49/4252* (2013.01); *B29B 2911/1402* (2013.01); *B29B 2911/1404* (2013.01); *B29B 2911/14026* (2013.01); *B29B 2911/14033* (2013.01); *B29B 2911/14106* (2013.01); *B29B 2911/14133* (2013.01); *B29B 2911/14326* (2013.01); *B29B 2911/14333* (2013.01); *B29B 2911/14446* (2013.01); *B29B 2911/14466* (2013.01); *B29B 2911/14486* (2013.01); *B29B 2911/14493* (2013.01); *B29C 49/06* (2013.01); *B29C 49/12* (2013.01); *B29C 49/6427* (2013.01); *B29C 2791/006* (2013.01)

(56) References Cited

U.S. PATENT DOCUMENTS

| | | | | |
|---|---|---|---|---|
| 4,512,735 A * | 4/1985 | Nilsson et al. | | 425/526 |
| 4,745,013 A * | 5/1988 | Kudert et al. | | 428/36.7 |
| 4,867,929 A * | 9/1989 | Albrecht et al. | | 264/521 |
| 4,915,992 A * | 4/1990 | Takakusaki et al. | | 428/36.92 |
| 4,927,680 A * | 5/1990 | Collette et al. | | 428/36.92 |
| 5,038,947 A * | 8/1991 | Strassheimer | | 215/373 |
| 5,158,817 A * | 10/1992 | Krishnakumar | | 428/36.92 |
| 5,508,076 A * | 4/1996 | Bright | | B29C 45/006 215/12.2 |
| 5,599,496 A * | 2/1997 | Krishnakumar et al. | | 264/532 |
| 5,648,133 A * | 7/1997 | Suzuki et al. | | 428/36.92 |
| 5,714,111 A * | 2/1998 | Beck et al. | | 264/532 |
| D403,959 S * | 1/1999 | Flancman | | D9/434 |
| 5,888,598 A | 3/1999 | Brewster et al. | | |
| 6,079,579 A * | 6/2000 | De Cuyper | | 215/41 |
| D454,497 S * | 3/2002 | Darr et al. | | D9/520 |
| 7,416,089 B2 * | 8/2008 | Kraft et al. | | 215/373 |
| 2006/0147664 A1 * | 7/2006 | Richards et al. | | 428/35.7 |
| 2008/0179271 A1 | 7/2008 | Bangi | | |
| 2009/0155501 A1 * | 6/2009 | Witz et al. | | 428/34.1 |
| 2010/0260886 A1 * | 10/2010 | Witz et al. | | 425/521 |
| 2012/0061885 A1 * | 3/2012 | Maki et al. | | 264/531 |

FOREIGN PATENT DOCUMENTS

| | | | | |
|---|---|---|---|---|
| EP | 0379264 A2 | | 7/1990 | |
| EP | 0413924 A1 | | 2/1991 | |
| EP | 2316626 | * | 5/2011 | ............. B29B 11/14 |
| GB | 1406700 A | | 9/1975 | |
| GB | 1441657 A | | 7/1976 | |
| JP | S52116462 U | | 9/1977 | |
| JP | 54146869 | * | 11/1979 | |
| JP | S5577535 A | | 6/1980 | |

OTHER PUBLICATIONS

Database WPI, Week 198001, Thomson Scientific, London, GB, Nov. 16, 1979.
European Search Report, Tomas Ingelgard, Sep. 9, 2014.

* cited by examiner

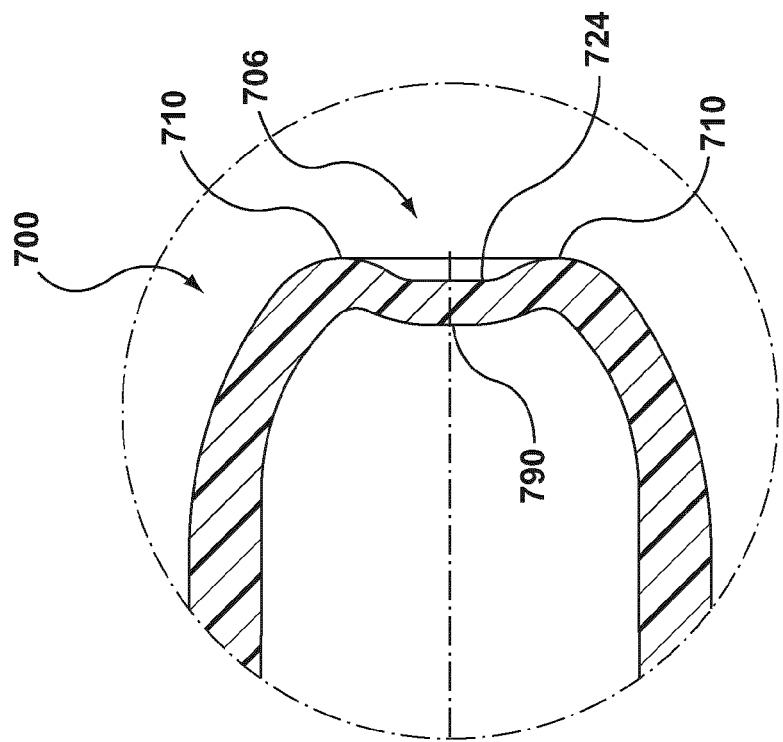
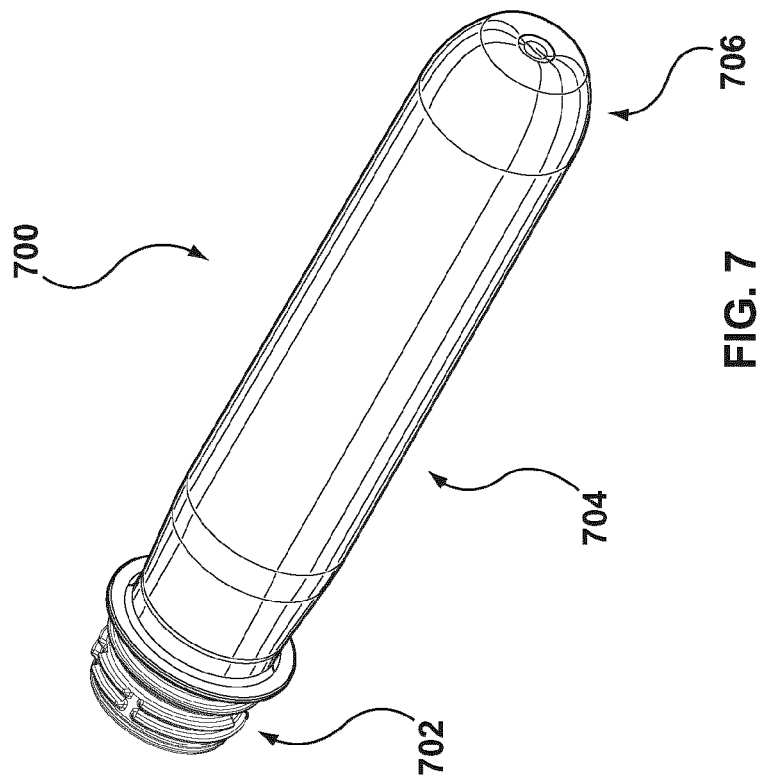
FIG. 8
FIG. 7

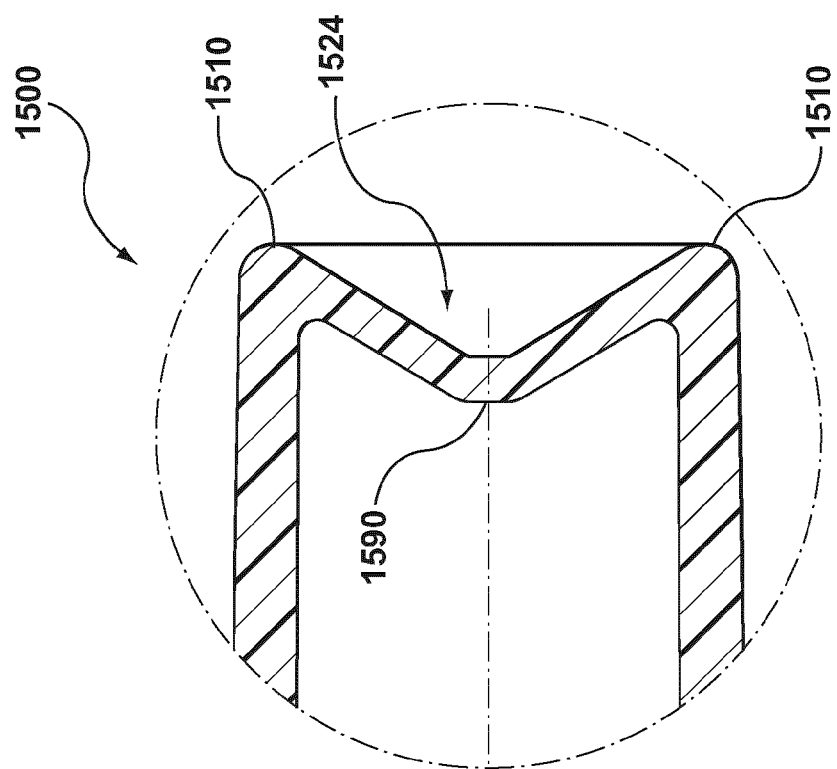
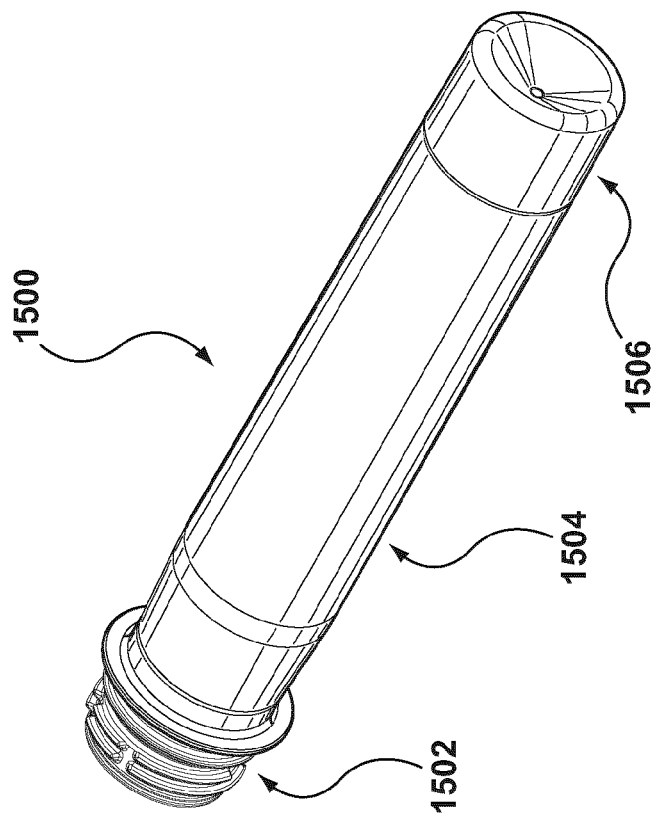
FIG. 16
FIG. 15

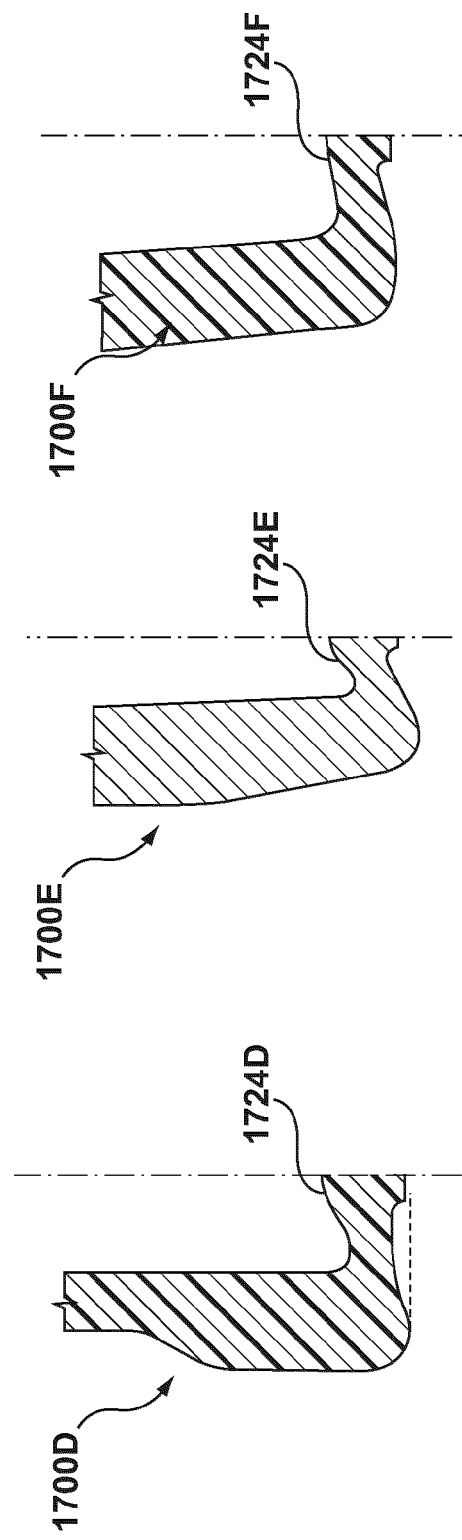
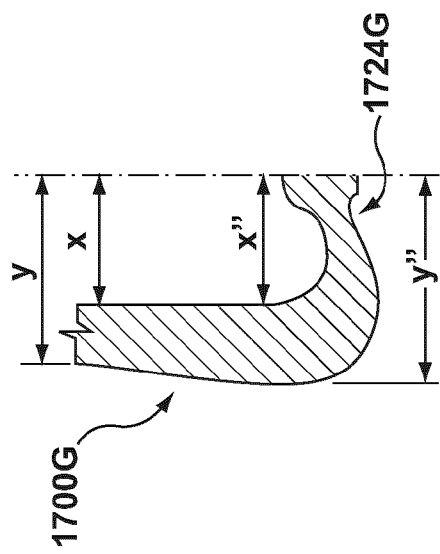
FIG. 17A  FIG. 17B  FIG. 17C  FIG. 17D

PREFORM AND A MOLD STACK FOR PRODUCING THE PREFORM

FIELD OF THE INVENTION

The present invention generally relates to, but is not limited to, a molding systems and processes, and more specifically the present invention relates to, but is not limited to, a preform and a mold stack for producing the preform

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

As an illustration, injection molding of PET material involves heating the PET material to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Thereafter, the molded article can be ejected off of the core piece by use of one or more ejection structure. Ejection structures are known to assist in removing the molded articles from the core halves. Examples of the ejection structures include stripper plates, stripper rings and neck rings, ejector pins, etc.

With reference to FIG. 1, a preform 100 is depicted, the preform 100 being an example of a typical prior art preform. The preform 100 consists of a neck portion 102, a gate portion 106 and a body portion 104 extending between the neck portion 102 and the gate portion 106. The gate portion 106 is associated with a substantially spherical shape that terminates in a vestige portion 108.

U.S. Pat. No. 5,599,496 discloses a method of making a refillable polyester container having a low orientation base with improved resistance to caustic wash cracking. The method includes providing a preform with an upper base-forming thickened portion which resists axial elongation (thereby increasing the orientation of the body) and a lower base-forming tapered portion which decreases in thickness so as to gradually reduce the wall thickness of a central dome in the container base. The bottom of the preform base includes a central thickened region which is maintained in a recess during blowing to insure centering and prevent the formation of stress concentrations.

US patent application 2008/0179271 discloses a container base that is capable of withstanding an internal pressure and further capable of causing an even deflection, such as that created by introducing liquefied gas during a hot filling process. The base includes a heel with a standing ring disposed at a lower portion thereon. A generally concave push up portion extends radially inward from the standing ring portion. At least two reinforcing rings are disposed on the push up portion, wherein the reinforcing rings diminish uneven deflection to prevent the container from tipping while resting on a flat surface.

SUMMARY OF THE INVENTION

According to a first broad aspect of the present invention, there is provided a preform suitable for subsequent blow-molding into a final-shaped container. The preform comprises a neck portion; a gate portion; and a body portion extending between said neck portion and said gate portion; the gate portion including an upwardly-bound region defined between the inner and outer walls thereof, substantially whole of the upwardly-bound region extending in a direction towards the neck portion.

According to a second broad aspect of the present invention, there is provided a mold stack for manufacturing a preform preform suitable for subsequent blow-molding into a final-shaped container, the preform including a neck portion; a gate portion; and a body portion extending between said neck portion and said gate portion; the gate portion including an upwardly-bound region defined between the inner and outer walls thereof, substantially whole of the upwardly-bound region extending in a direction towards the neck portion. The mold stack comprises a gate insert that includes a molding face a portion of which is configured to define the gate portion that includes the upwardly-bound region, which upwardly-bound region.

These and other aspects and features will now become apparent to those skilled in the art upon review of the following description of specific non-limiting embodiments in conjunction with the accompanying drawings.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIG. 7 depicts a perspective view of a preform and

FIG. 8 depicts a portion of the preform of FIG. 7, the preform being implemented in accordance with yet another non-limiting embodiment of the present invention.

FIG. 15 depicts a perspective view of a preform and

FIG. 16 depicts a portion of the preform of FIG. 15, the preform being implemented in accordance with another non-limiting embodiment of the present invention.

FIGS. 17A-17D, which depict a portion of a respective preforms implemented in accordance with yet further embodiments of the present invention.

DETAILED DESCRIPTION OF EMBODIMENTS

Figure 2:
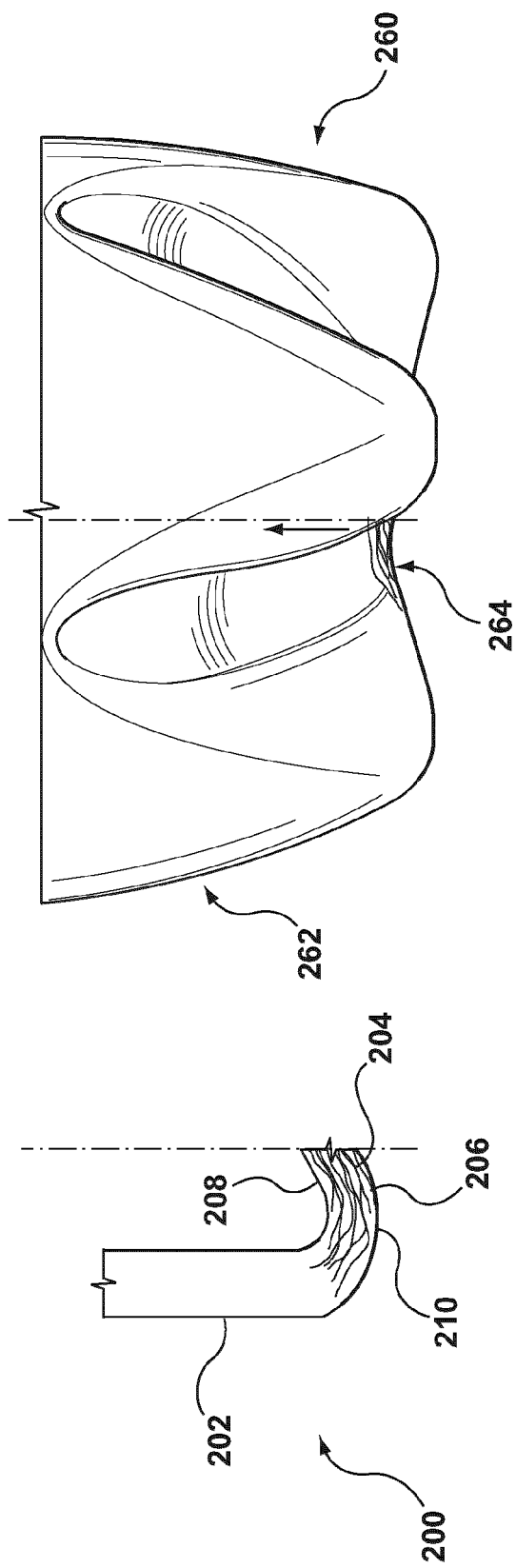
FIG. 2, is a schematic representation of a portion of a preform implemented according to a non-limiting embodiment of the present invention and a portion of a container that is subsequently blow-molded from the preform.

Reference is now made to FIG. 2, which depicts a schematic representation of a portion of a preform 200 implemented according to a non-limiting embodiment of the present invention and a portion of a final-shaped container 260 that is subsequently blow-molded from the preform 200.

Figure 1:
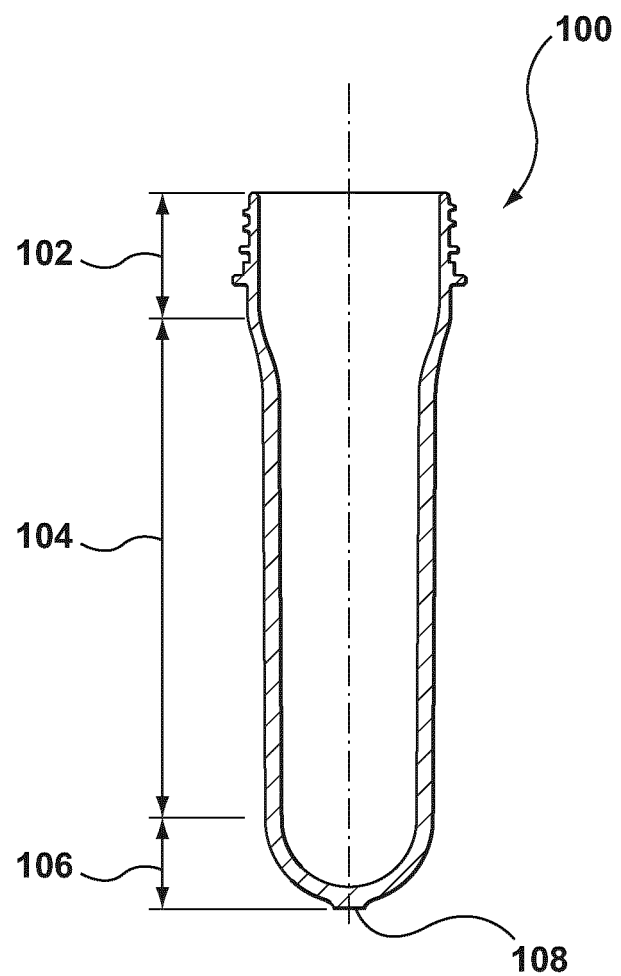
FIG. 1 depicts a cross section view of a preform 100 implemented in accordance with known techniques.

It is noted that even though not depicted in FIG. 2, the preform 200 consists of a neck portion, a gate portion (a portion of which is depicted at 202) and a body portion extending between the neck portion and the gate portion, much akin to the preform 100 of FIG. 1. The neck portion and the body portion of the preform 200 can be implemented in a substantially similar manner to the neck portion 102 and the body portion 104 of the preform 100 of FIG. 1.

It should be further appreciated that FIG. 2 depicts only one-half of the gate portion 202, the other half (not depicted) being a mirror image thereof.

The gate portion 202 is implemented in accordance with non-limiting embodiments of the present invention. More specifically the gate portion 202 comprises an upwardly-bound region 204 defined between an outer wall 206 and an inner wall 208 thereof. It is noted that substantially the whole of the upwardly-bound region 204 extends in a direction towards the neck portion (i.e. the top of the preform 200 as viewed in FIG. 2, of the whole if the preform 200 was shown). In other words, the upwardly-bound region 204 extends upwardly towards the neck portion relative to a lowest-most extremity 210 of the gate portion 202. Put another way, it can be said that the lowest-most extremity 210 defines the beginning of the upwardly-bound region 204, at least in the example presented in FIG. 2.

Also shown in FIG. 2 is a portion of the final-shaped container 260, the final-shaped container 260 having been produced from the preform 200 by known techniques, such as blow-molding techniques, stretch-blow-molding techniques and the like. The final-shaped container 260 comprises a container base 262. The container base 262 is implemented as "petaloid-base" type having a plurality of legs (not separately numbered). In alternative embodiments, the final-shaped container 260 can be implemented as a "champagne-base" container (not depicted). The container base 262 includes an upwardly-bound container region 264. The upwardly-bound container region 264 is generally defined from the material that was defining the upwardly-bound region 204 of the preform 200. According to embodiments of the present invention and based on the so-called "memory effect" phenomenon associated with the molding material used for forming the preform 200 (and, therefore, the final-shaped container 260), the upwardly-bound container region 264 is urged upwardly (as viewed in FIG. 2) or, in other words, towards the neck portion (not depicted) of the preform 200/final-shaped container 260. As is known to those of skill in the art, the memory effect phenomenon is linked to the injection process and the shape of the preform so being formed. A technical effect of the embodiments of the present invention includes enhanced stability due at least partially to this upward urging of the material within the container base 262, instead of buckling out (i.e. in the downward direction, as viewed in FIG. 2) as may be the case with traditional preforms, such as some variations of the preform 100 depicted in FIG. 1.

What follows is the description of other non-limiting embodiments that can be used to implement the upwardly-bound region 204. It should be expressly understood that various features described above and below can be mixed in various additional non-limiting embodiments, even if not specifically depicted herein.

Figure 4:
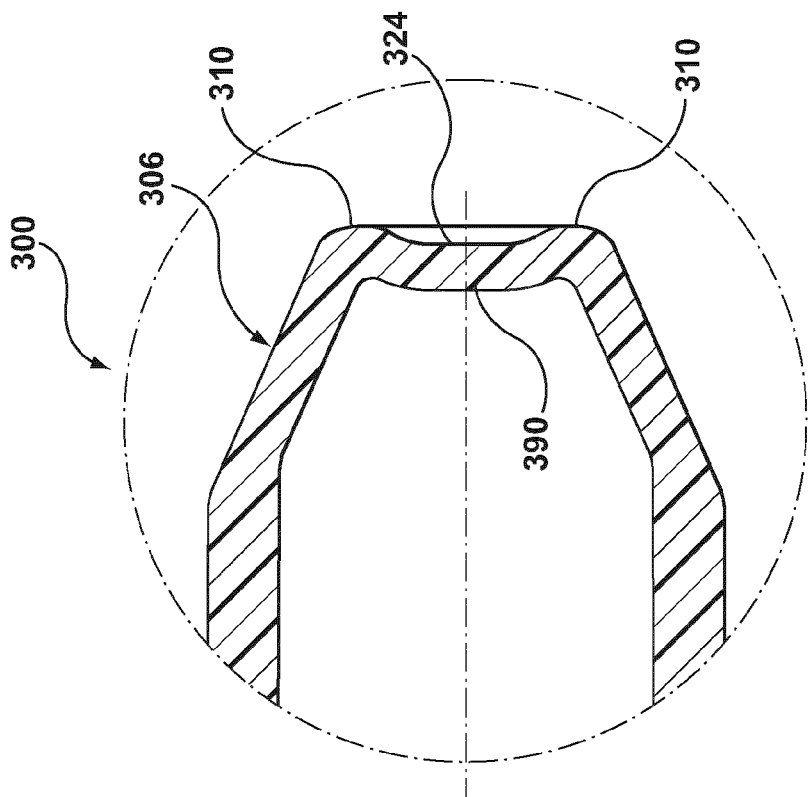
FIG. 4 depicts a portion of the preform of FIG. 3, the preform being implemented in accordance with another non-limiting embodiment of the present invention.
Figure 3:
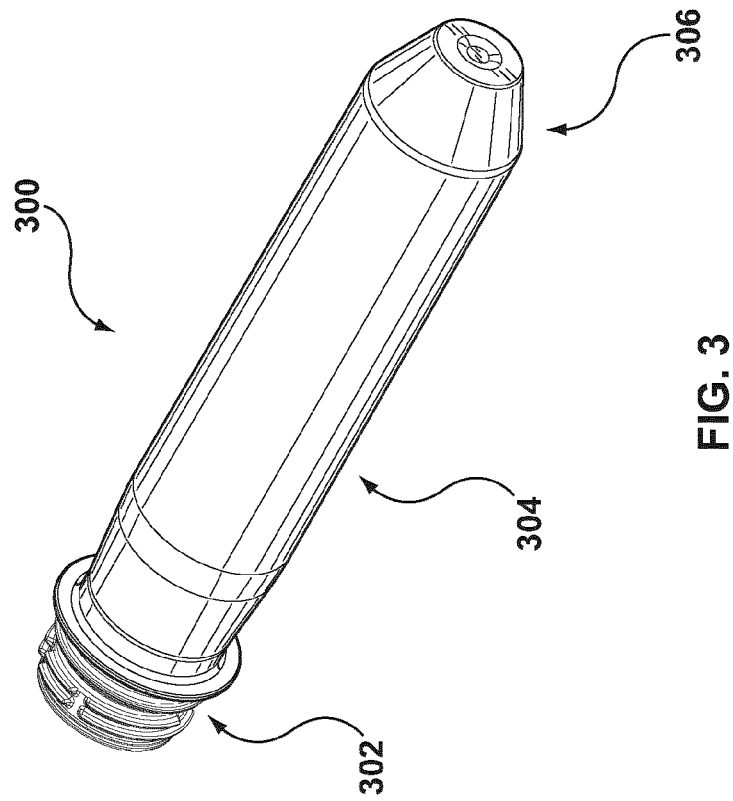
FIG. 3 depicts a perspective view of a preform.

FIG. 3 depicts a perspective view of a preform 300 and FIG. 4 depicts a portion of the preform 300 of FIG. 3, the preform 300 being implemented in accordance with another non-limiting embodiment of the present invention. The preform 300 consists of a neck portion 302, a gate portion 306 and a body portion 304 extending between the neck portion 302 and the gate portion 306. It is noted that the neck portion 302 and the body portion 304 can be implemented according to any known technique(s), standard(s) and design(s)—and as such, the neck portion 302 and the body portion 304 are depicted for illustration purposes only. The gate portion 306 is implemented in accordance with a non-limiting embodiment of the present invention.

The gate portion 306 comprises an upwardly-bound region 324. The upwardly-bound region 324 extends from a lowest-most extremity 310 towards a region peak portion 390. The shape of the upwardly-bound region 324, within this embodiment of the present invention, can be categorized as generally semi-spherical in nature. It is noted that in this embodiment of the present invention, the gate portion 306 is implemented as a conical variation with the inner and outer walls (not separately numbered) of the gate portion 306 extending between the body portion 304 and the lowest-most extremity 310 are generally parallel therebetween.

Figure 6:
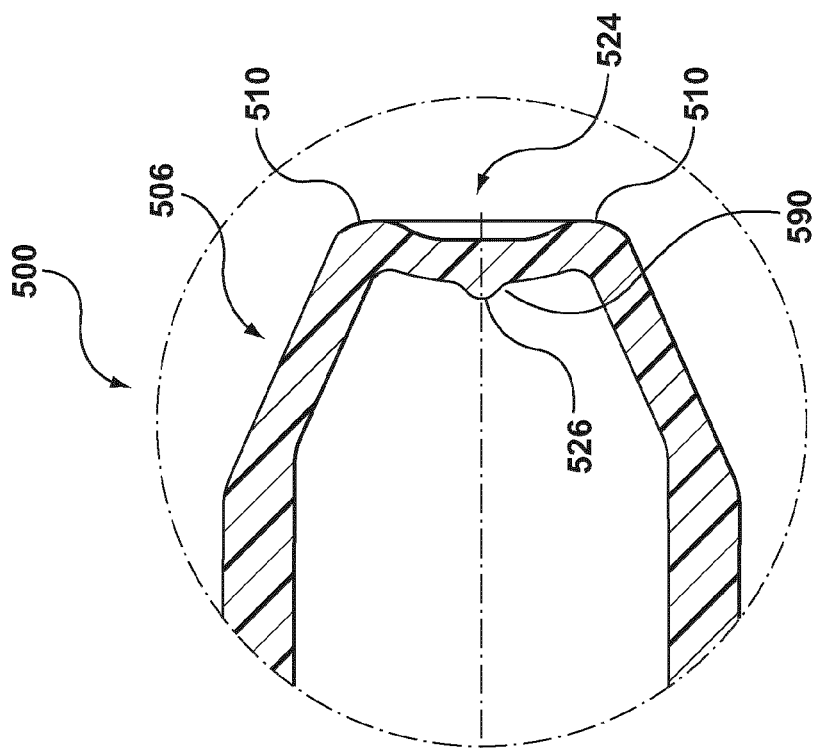
FIG. 6 depicts a portion of the preform of FIG. 5, the preform being implemented in accordance with another non-limiting embodiment of the present invention.
Figure 5:
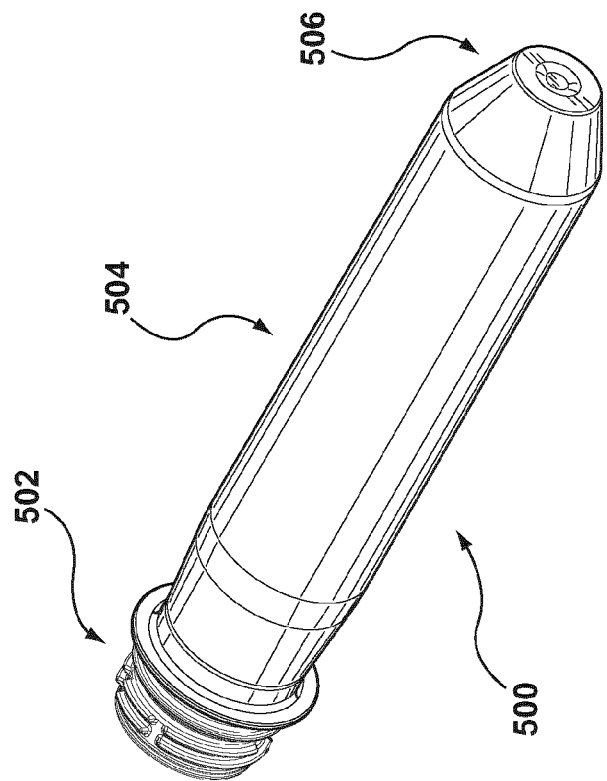
FIG. 5 depicts a perspective view of a preform.

FIG. 5 depicts a perspective view of a preform 500 and FIG. 6 depicts a portion of the preform 500 of FIG. 5, the preform 500 being implemented in accordance with another non-limiting embodiment of the present invention. The preform 500 consists of a neck portion 502, a gate portion 506 and a body portion 504 extending between the neck portion 502 and the gate portion 506. It is noted that the neck portion 502 and the body portion 504 can be implemented according to any known technique(s), standard(s) and design(s)—and as such, the neck portion 502 and the body portion 504 are depicted for illustration purposes only. The gate portion 506 is implemented in accordance with a non-limiting embodiment of the present invention.

The gate portion 506 comprises an upwardly-bound region 524. The upwardly-bound region 524 extends from a lowest-most extremity 510 towards a region peak portion 590. The shape of the upwardly-bound region 524, within this embodiment of the present invention, can be categorized as generally semi-spherical in nature. However, in accordance with this embodiment of the present invention, the upwardly-bound region 524 comprises a locating bump 526 defined within on the inner wall of the gate portion 506 and, namely, the locating bump 526 is defined on the region peak portion 590. An additional technical effect of this embodiment of the present invention can include ability to positively locate a stretch rod (not depicted) used during the stretch blow molding operation to convert the preform 500 into the final-shaped container 260.

It is noted that in this embodiment of the present invention, the gate portion 506 is implemented as a conical variation with the inner and outer walls (not separately numbered) of the gate portion 506 extending between the body portion 504 and the lowest-most extremity 510 are generally parallel therebetween.

FIG. 7 depicts a perspective view of a preform 700 and FIG. 8 depicts a portion of the preform 700 of FIG. 7, the preform 700 being implemented in accordance with yet another non-limiting embodiment of the present invention. The preform 700 consists of a neck portion 702, a gate portion 706 and a body portion 704 extending between the neck portion 702 and the gate portion 706. It is noted that the neck portion 702 and the body portion 704 can be implemented according to any known technique(s), standard(s) and design(s)—and as such, the neck portion 702 and the body portion 704 are depicted for illustration purposes only. The gate portion 706 is implemented in accordance with a non-limiting embodiment of the present invention.

The gate portion 706 comprises an upwardly-bound region 724. The upwardly-bound region 724 extends from a lowest-most extremity 710 towards a region peak portion 790. The shape of the upwardly-bound region 724, within this embodiment of the present invention, can be categorized as generally semi-spherical in nature. It is noted that in this embodiment of the present invention, the gate portion 706 is implemented as a generally semi-spherical variation with the inner and outer walls (not separately numbered) of the gate portion 706 defining a respective radii extending between the body portion 704 and the lowest-most extremity 710.

Figure 10:
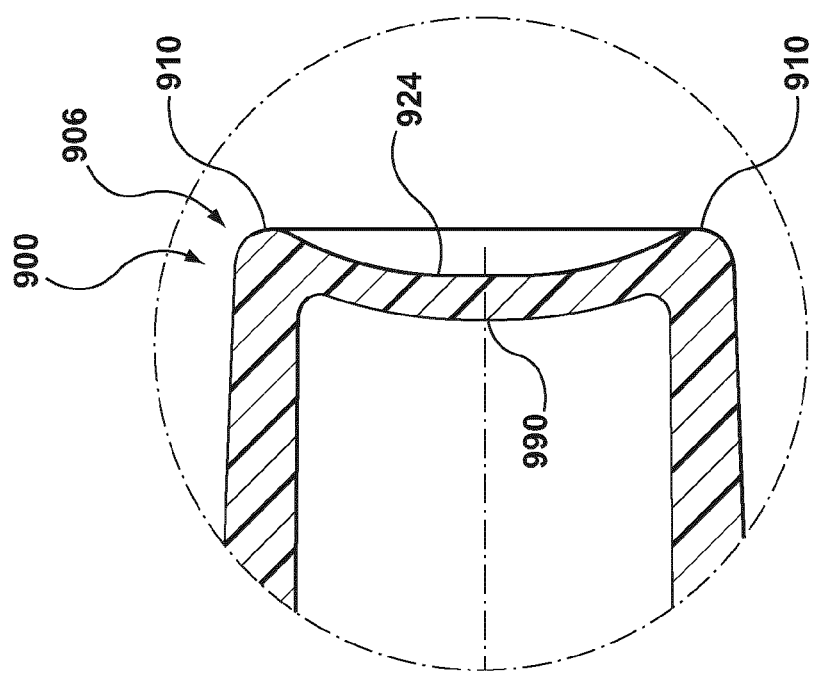
FIG. 10 depicts a portion of the preform of FIG. 9, the preform being implemented in accordance with a further non-limiting embodiment of the present invention.
Figure 9:
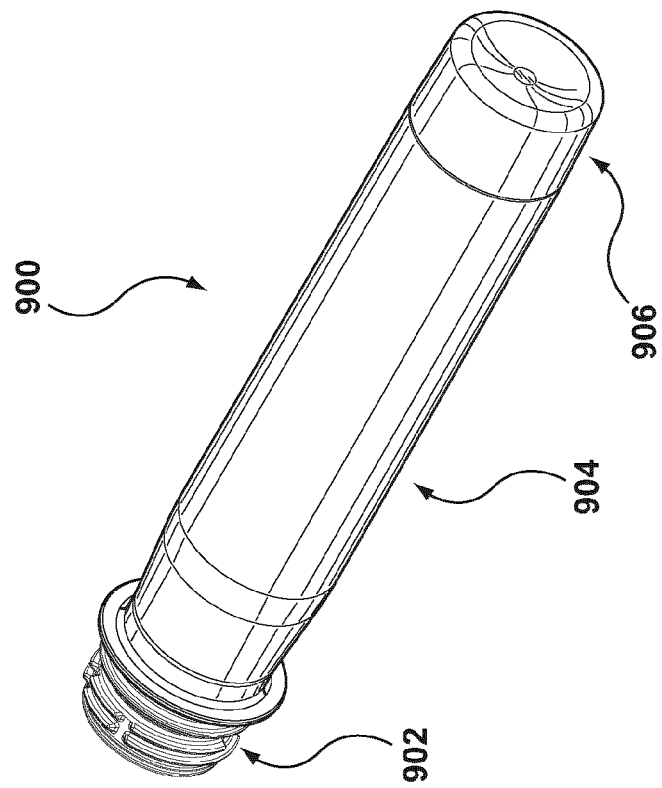
FIG. 9 depicts a perspective view of a preform.

FIG. 9 depicts a perspective view of a preform 900 and FIG. 10 depicts a portion of the preform 900 of FIG. 9, the preform 900 being implemented in accordance with yet another non-limiting embodiment of the present invention. The preform 900 consists of a neck portion 902, a gate portion 906 and a body portion 904 extending between the neck portion 902 and the gate portion 906. It is noted that the neck portion 902 and the body portion 904 can be implemented according to any known technique(s), standard(s) and design(s)—and as such, the neck portion 902 and the body portion 904 are depicted for illustration purposes only. The gate portion 906 is implemented in accordance with a non-limiting embodiment of the present invention.

The gate portion 906 comprises an upwardly-bound region 924. The upwardly-bound region 924 extends from a lowerest extremity 910 towards a region peak portion 990. The shape of the upwardly-bound region 924, within this embodiment of the present invention, can be categorized as generally semi-spherical in nature. It is noted that in this embodiment of the present invention, the gate portion 906 is implemented without a pronounced transition from the body portion 904. In other words and as can be appreciated from FIG. 10, the body portion 904 terminates into the lowerest extremity 910.

Figure 12:
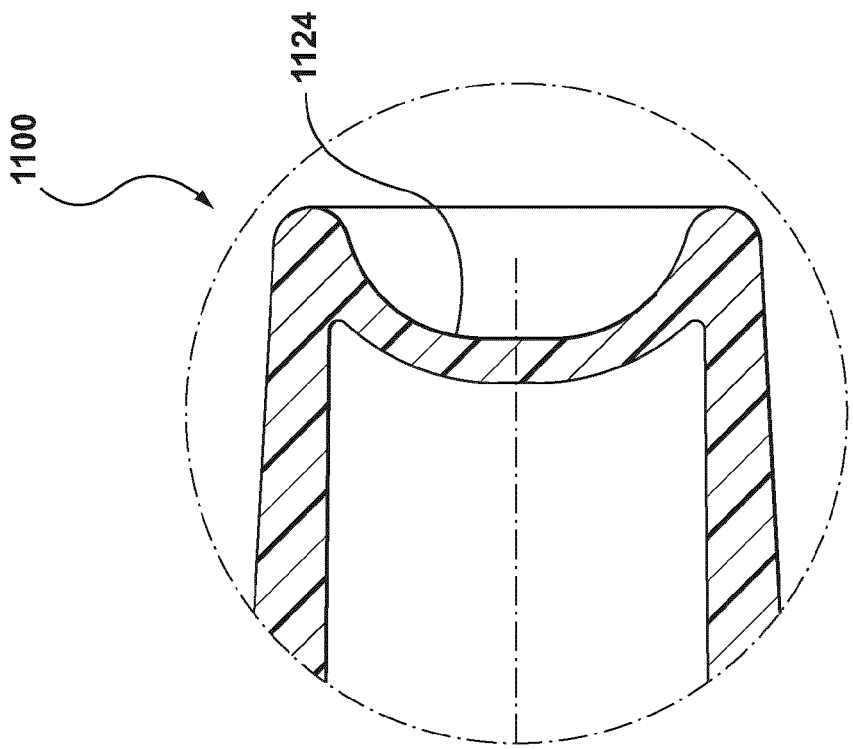
FIG. 12 depicts a portion of the preform of FIG. 11, the preform being implemented in accordance with another non-limiting embodiment of the present invention.
Figure 11:
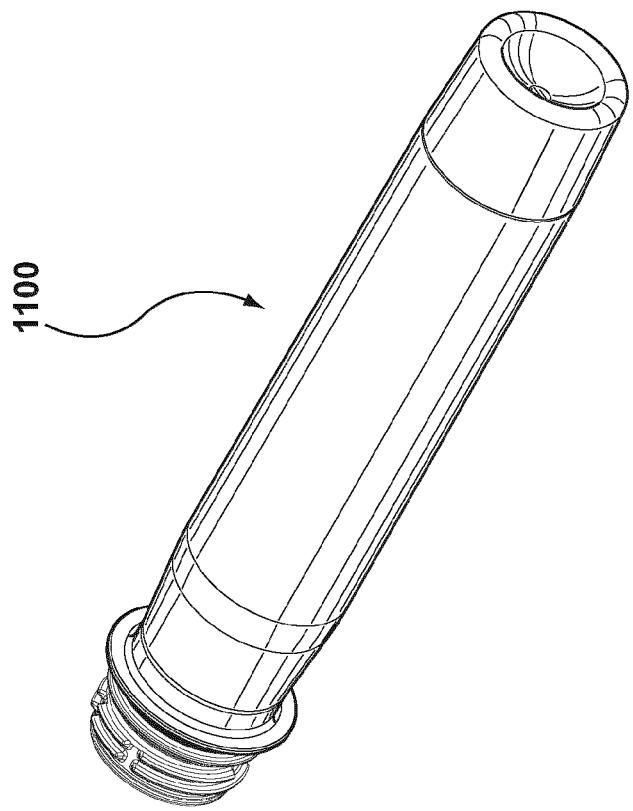
FIG. 11 depicts a perspective view of a preform.

A variation of the embodiment of FIG. 9 and FIG. 10 is further depicted with reference to FIGS. 11 and 12, in which FIG. 11 depicts a perspective view of a preform 1100 and FIG. 12 depicts a portion of the preform 110 of FIG. 11, the preform 1100 being implemented in accordance with yet another non-limiting embodiment of the present invention. The preform 1100 is implemented substantially similar to that of preform 900 other then an upwardly-bound region 1124 is associated with a more pronounced radius.

Figure 14:
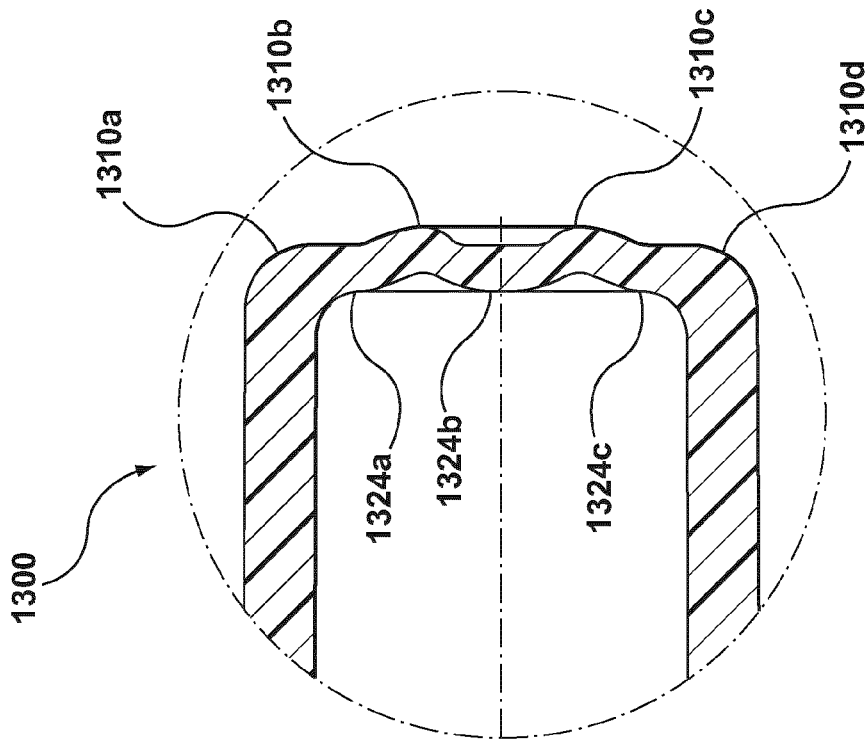
FIG. 14 depicts a portion of the preform of FIG. 13, the preform being implemented in accordance with another non-limiting embodiment of the present invention.
Figure 13:
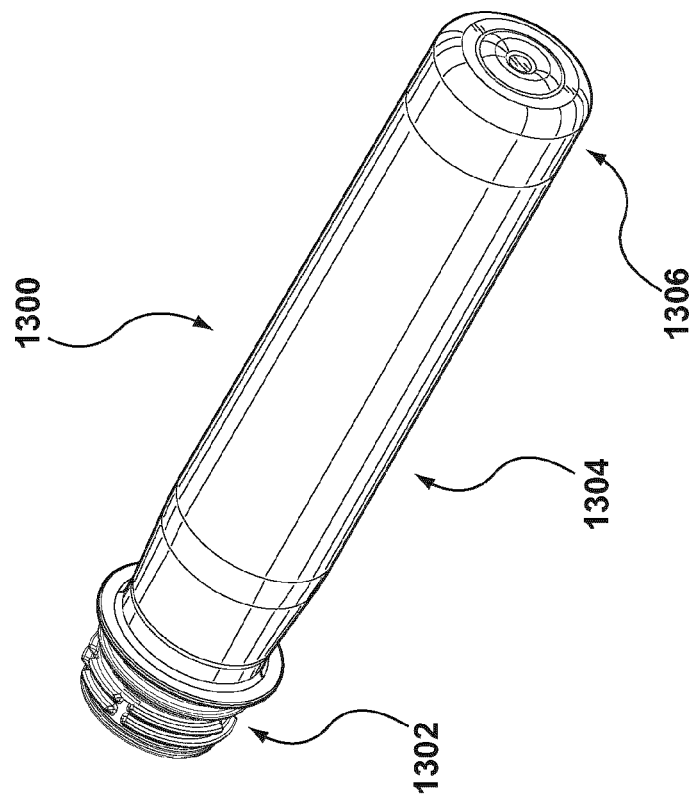
FIG. 13 depicts a perspective view of a preform.

FIG. 13 depicts a perspective view of a preform 1300 and FIG. 14 depicts a portion of the preform 1300 of FIG. 13, the preform 1300 being implemented in accordance with yet another non-limiting embodiment of the present invention. The preform 1300 consists of a neck portion 1302, a gate portion 1306 and a body portion 1304 extending between the neck portion 1302 and the gate portion 1306. It is noted that the neck portion 1302 and the body portion 1304 can be implemented according to any known technique(s), standard(s) and design(s)—and as such, the neck portion 1302 and the body portion 1304 are depicted for illustration purposes only. The gate portion 1306 is implemented in accordance with a non-limiting embodiment of the present invention.

Within this embodiment of the present invention, the gate portion 1306 comprises a plurality of lower-most extremities and a plurality of upwardly-bound regions. More specifically, the gate portion 1306 can comprise a first upwardly-bound region 1324a, a second upwardly-bound region 1324b and a third upwardly-bound region 1324c. The first upwardly-bound region 1324a is extending between a first lower-most extremity 1310a and a second lower-most extremity 1310b. The second upwardly-bound region 1324b is extending between the second lower-most extremity 1310b and a third lower-most extremity 1310c. The third upwardly-bound region 1324c is extending between the third lower-most extremity 1310c and a fourth lower-most extremity 1310d.

FIG. 15 depicts a perspective view of a preform 1500 and FIG. 16 depicts a portion of the preform 1500 of FIG. 15, the preform 1500 being implemented in accordance with yet another non-limiting embodiment of the present invention. The preform 1500 consists of a neck portion 1502, a gate portion 1506 and a body portion 1504 extending between the neck portion 1502 and the gate portion 1506. It is noted that the neck portion 1502 and the body portion 1504 can be implemented according to any known technique(s), standard(s) and design(s)—and as such, the neck portion 1502 and the body portion 1504 are depicted for illustration purposes only. The gate portion 1506 is implemented in accordance with a non-limiting embodiment of the present invention.

The gate portion 1506 comprises an upwardly-bound region 1524. The upwardly-bound region 1524 extends between a lowerest extremity 1510 and a region peak portion 1590. The shape of the upwardly-bound region 1524, within this embodiment of the present invention, can be categorized as generally conical in nature. In other words, it can be said that a cone is defined with a base defined by the lowerest extremity 1510 and the region peak portion 1590. It is noted that in this embodiment of the present invention, the gate portion 1506 is implemented without a pronounced transition from the body portion 1504. In other words and as can be appreciated from FIG. 16, the body portion 1504 terminates into the lowerest extremity 1510.

It is noted that inventors contemplate numerous additional variations and/or enhancements to the geometry of the gate portions 202, 306, 506, 706, 906, 1106, 1306, 1506. For example, even though the above description contemplates the gate portions 202, 306, 506, 706, 906, 1106, 1306, 1506 to be of substantially constant thickness, this needs not be so in every embodiment of the present invention. As such, in alternative embodiments of the present invention, it is contemplated that the wall thickness of the gate portions 202, 306, 506, 706, 906, 1106, 1306, 1506 can be varied. For example, the wall thickness can be varied to create a heat absorption profile, as may be required for a given application. The wall thickness can also be varied for better positioning of the stretch rod used during the stretch blow-molding process. It is also contemplated that a portion of the gate portions 202, 306, 506, 706, 906, 1106, 1306, 1506 can include a step, either inwardly or outwardly or both vis-à-vis a center axis of the preform.

Examples of some of such alternative implementations will be described in further detail with reference to FIGS. 17A-17D, which depict a portion of a respective preform 1700D-1700G implemented in accordance with yet further embodiments of the present invention. Each instance of the preform 1700D-1700G comprises a respective upwardly-bound region 1724D-1724G. Preform 1700D is an example of an implementation whereby the gate portion includes a step on an outside wall, resulting in the gate portion having a thicker wall then the body portion. Preform 1700E is an example of an implementation whereby the wall thickness of the gate portion gradually reduces towards the bottom of the preform. Preform 1700F is an example of an implementation whereby the wall thickness of the gate portion gradually increases towards the bottom of the preform. Preform 1700G is an example of a preform implemented with a modified draft. More specifically, preform 1700G is associated with a first outer radius y and a first inner radius x. Located closer to the upwardly-bound region 1724G, the preform 1700G is associated with a second outer radius y" (which is larger then the first outer radius y) and a second inner radius y" (which is larger then the first inner radius y). Those skilled in the art will appreciate that FIGS. 17A-17D are meant to be illustrations of some of the alternative embodiments rather then an exhaustive list thereof.

It should be expressly understood that various features described above and below can be mixed in various additional non-limiting embodiments, even if not specifically depicted herein. Just as an example, the locating bump 526 described with reference to FIG. 6 can be applied to other embodiments of the present invention. By the same token, the thickness variations and the steps can also me matched and mixed with other embodiments and variations described herein.

The above described embodiments of a gate portion, namely the gate portions 202, 306, 506, 706, 906, 1106, 1306, 1506, can be manufactured using a standard gate insert (not depicted) similar to that used to produce the gate portion 106 depicted in FIG. 1. Such gate insert can be of a one-piece construction or a two piece construction. An example of the two-piece construction of the gate insert is disclosed in a co-owned U.S. Pat. No. 7,566,216 issued to Kmoch et al on Jul. 28, 2009.

Naturally, the molding surface defining face of the gate insert, whether one piece or two piece, needs to be adapted to define the geometry of the gate portions 202, 306, 506, 706, 906, 1106, 1306, 1506 described above. In some embodiments of the present invention, the fate insert and/or the cavity insert may need to be implemented as a split insert (as is known in the art) to manufacture undercut portions of the design, such as for example, the case is in the embodiment of FIG. 17A.

Figure 18:
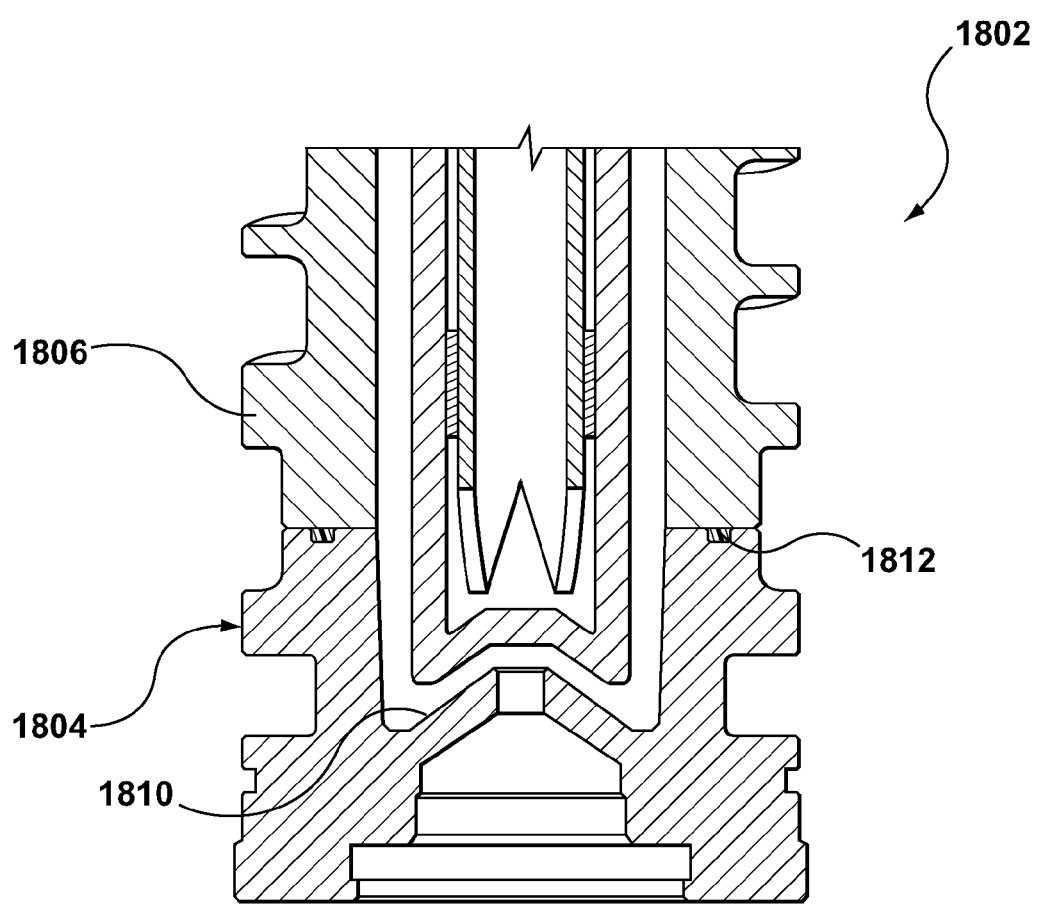
FIG. 18 depicts a portion of a mold stack for manufacturing the preform 1500 of FIGS. 15, the mold stack being implemented according to a non-limiting embodiment of the present invention.
Figure 19:
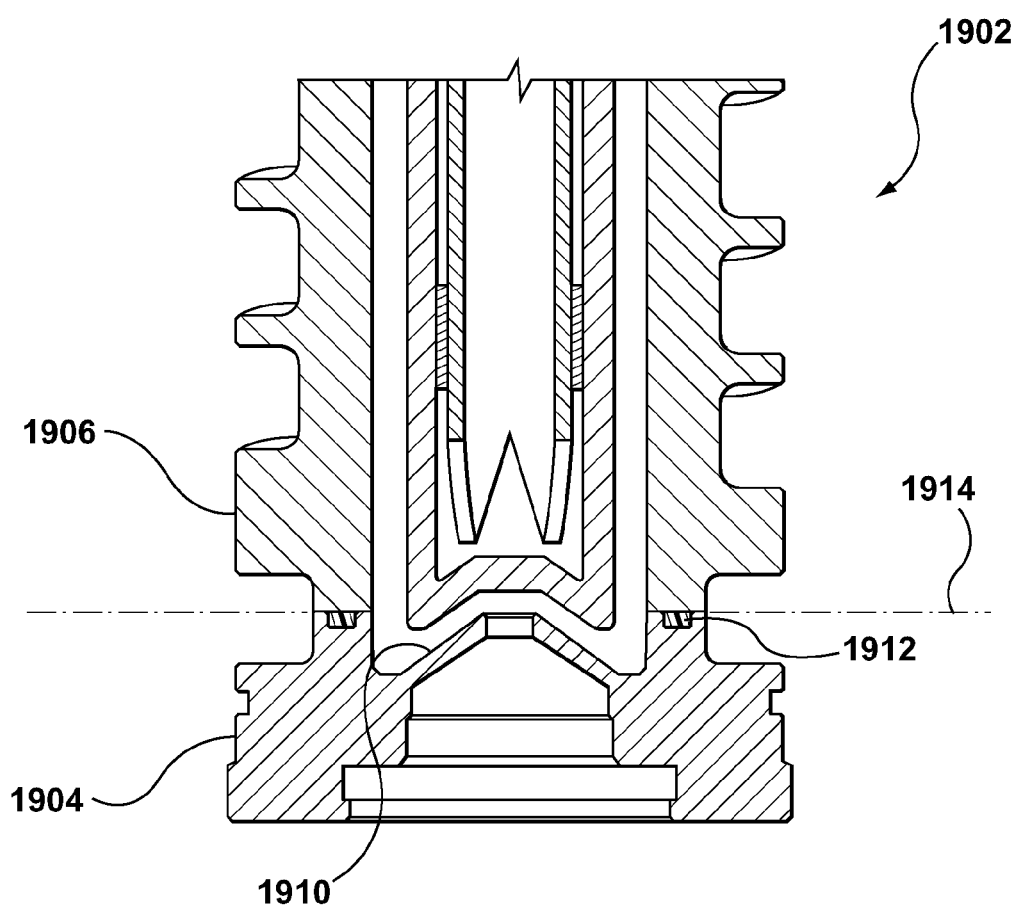
FIG. 19 depicts a portion of a mold stack for manufacturing the preform 1500 of FIG. 15, the mold stack being implemented in accordance with another embodiment of the present invention.

With reference to FIGS. 18 and 19, non-limiting embodiments of a molding stack for producing preforms in accordance with various non-limiting embodiments of the present invention shall be described. Specifically, FIG. 18 depicts a portion of a mold stack 1802 for manufacturing the preform 1500 of FIGS. 15 and 16 and FIG. 19 depicts a portion of a mold stack 1902 for manufacturing the preform 1500.

Mold stack 1802 includes a gate insert 1804 and a cavity insert 1806, only a portion of which is depicted. The gate insert 1804 includes a molding face 1810, a portion of which is configured to define the gate portion 1506 that includes the upwardly-bound region 1524, which upwardly-bound region 1524 extends between the lowerest extremity 1510 and the region peak portion 1590, as described above. It is worthwhile noting that there is a split line 1812 defined between the gate insert 1804 and the cavity insert 1806. It is noted that in this embodiment, it can be said that the portion of the gate insert 1804 defining the gate portion 1506 is encapsulated below the split line 1812, the term below referring to the direction as seen in FIG. 18.

Mold stack 1902 includes a gate insert 1904 and a cavity insert 1906, only a portion of which is depicted. The gate insert 1904 includes a molding face 1910, a portion of which is configured to define the gate portion 1506 that includes the upwardly-bound region 1524, which upwardly-bound region 1524 extends between the lowerest extremity 1510 and the region peak portion 1590, as described above. It is worthwhile noting that there is a split line 1912 defined between the gate insert 1804 and the cavity insert 1806. It is noted that in this embodiment, it can be said that the split line 1912, if it was continued in a virtual line 1914, would penetrate the portion of the gate insert 1804 defining the gate portion 1506.

It is expected that those skilled in the art will be able to adapt teachings of the mold stack 1802, 1902 presented in regard to preform 1500 to mold stacks for production of other embodiments of the preforms discussed herein.

In alternative non-limiting embodiments of the present invention, the gate portions 202, 306, 506, 706, 906, 1106, 1306, 1506 can be molded using the standard gate insert, as for example one used for molding the gate portion 106 of FIG. 1 with a shape as known in the prior and then reshaped into geometries described with reference to gate portions 202, 306, 506, 706, 906, 1106, 1306, 1506. The reshaping can be done, for example, in an End-of-Arm tool, which is used for post-mold treatment of the preforms. It is anticipated that by de-molding the preform at a slightly elevated temperature vis-à-vis prior art approaches and/or by using pulsed heating and/or cooling in the End-Of-Arm Tool, it should be possible to reshape a standard preform into a preform having the gate portions 202, 306, 506, 706, 906, 1106, 1306, 1506.

Figure 20A:
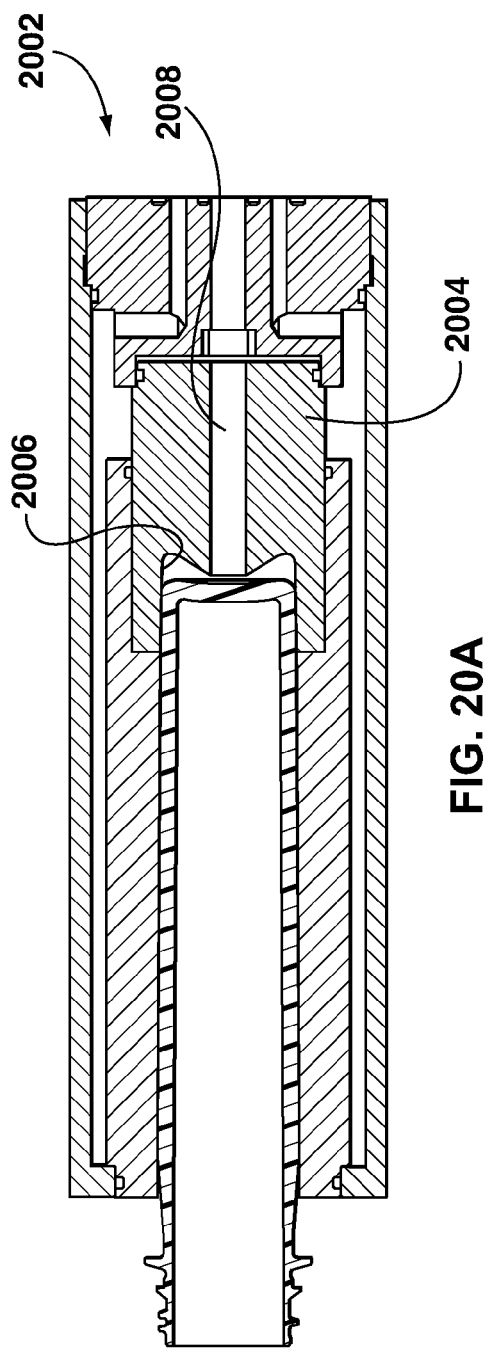
FIGS. 20A and 20B depict a cross section of a preform holder that can be used in some embodiments of the present invention to define portions of the preforms according to embodiments of the present invention.
Figure 20B:
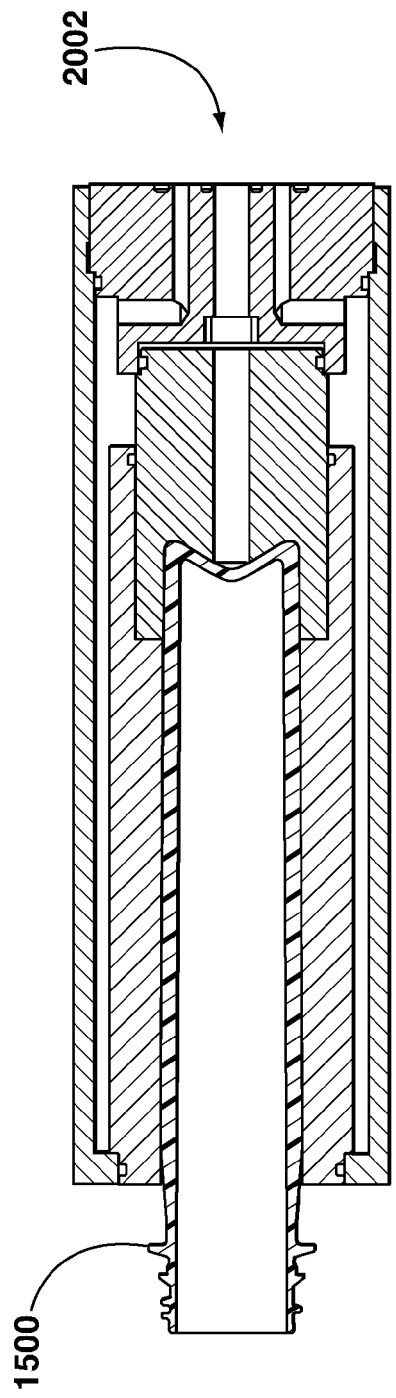

An example of such an alternative implementation is depicted with reference to FIG. 20A and FIG. 20B. FIG. 20A depicts a cross section of a preform holder 2002 of a post-mold cooling apparatus (not depicted), the preform holder 2002 implemented in accordance with a non-limiting embodiment of the present invention. The preform holder 2002 is depicted at stage where it has received a preform 1500 manufactured in a standard gate insert for producing a flat bottom preforms. FIG. 20B depicts a cross section of the preform holder 2002 after the preform 1500 has been re-shaped into the state depicted in FIG. 15. The preform holder 2002 comprises a bottom insert 2004 having a contoured face 2006 that has a geometry of the final shape of the preform 1500 depicted in FIG. 15. The bottom insert 2004 also includes a vacuum channel 2008 connectable, in use, to a source of under-pressure. When the preform 1500 is received in the preform holder 2002, after it has been molded, and under application of vacuum, the gate portion 1506 is reshaped to have the upwardly-bound region 1524. It is expected that construction of the preform holder 2002 can be easily adapted for reshaping preforms according to other embodiments described above. In other words, the preform holder 2002 is configured for reshaping a preform suitable for subsequent blow-molding into a final-shaped container, from preform molded in a standard gate insert mold stack to a preform implemented according to embodiments of the present invention, by providing a bottom insert having a countoured face and a vacuum channel, the countoured face configured to define the gate portion that includes the upwardly-bound region under application of under-pressure through the vacuum channel.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims.

What is claimed is:

1. An injection molded preform suitable for subsequent blow-molding into a final-shaped container, the preform comprising:
    a neck portion;
    a gate portion having a substantially constant thickness; and
    a body portion extending between said neck portion and said gate portion;
    wherein the gate portion is implemented as either a conical form or a semi-spherical shape extending between the body portion and a lower-most extremity; and
    the gate portion further comprises an upwardly-bound region of a semi-spherical or conical shape extends upwardly from the lower-most extremity towards the neck portion, whole of the upwardly-bound region extending in a direction towards the neck portion;
    wherein the upwardly-bound region includes an outer planar surface of a gate vestige at an apex thereof
    wherein the upwardly-bound region is blow moldable to form an upwardly-bound container region of the container.

2. The preform of claim 1, wherein the upwardly-bound region further includes a locating bump defined on an inner surface of the gate portion, the locating bump for positively locating a stretch rod used during the blow-molding process.

3. A process for molding a container, comprising:
    injection molding a preform having a neck portion, a gate portion and a body portion extending between said neck portion and said gate portion, wherein the gate portion, having a substantially constant thickness, is implemented as either a conical form or a semi-spherical shape extending between the body portion and a lower-most extremity, wherein the gate portion further comprises an upwardly-bound region of a semi-spherical or conical shape that extends upwardly from the lower-most extremity towards the neck portion, whole of the upwardly-bound region extending in a direction towards the neck portion, wherein the upwardly-bound region includes an outer planar surface of a gate vestige at an apex thereof;
    blow-molding the injection molded preform into the final-shaped container, wherein the upwardly-bound region is blow molded to form an upwardly-bound container region of the container.

* * * * *